A. E. MARSH.
EGG OPENER.
APPLICATION FILED MAY 11, 1912.
1,070,827.  Patented Aug. 19, 1913.
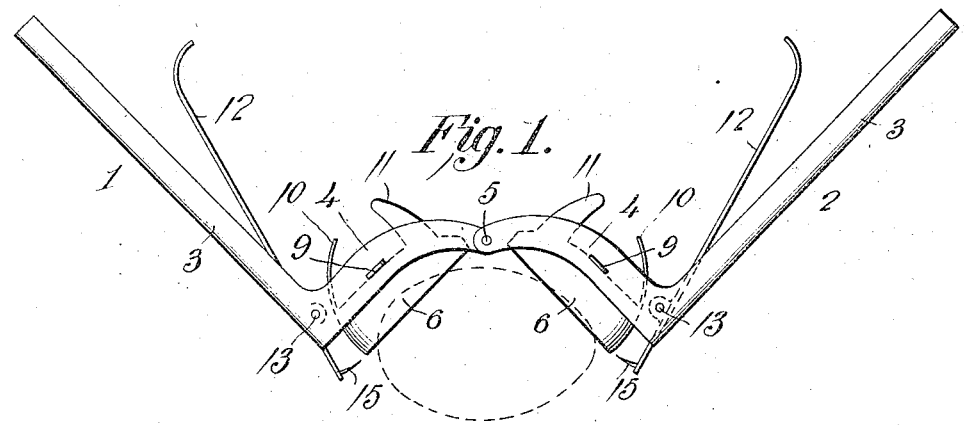
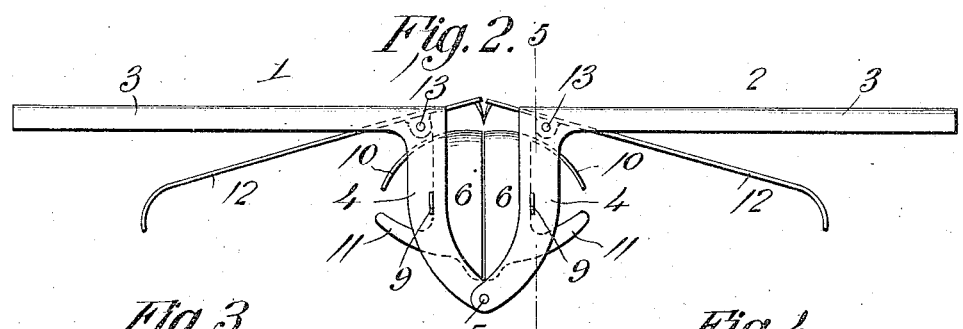
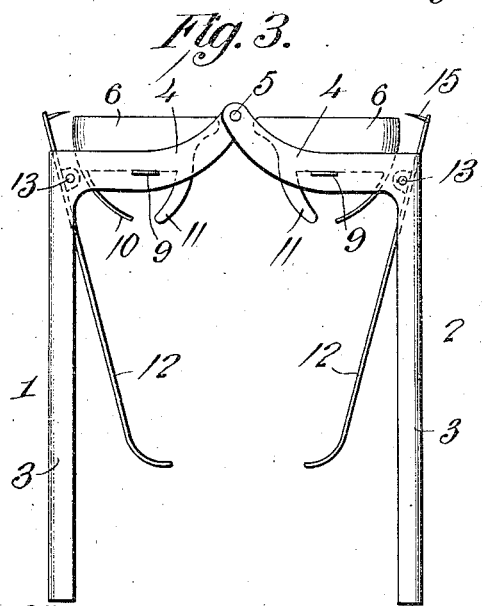
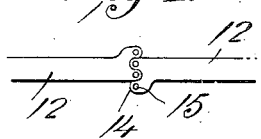
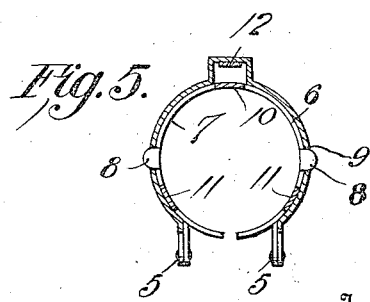
Inventor
Arthur E. Marsh,
By Victor J. Evans
Attorney
Witnesses

UNITED STATES PATENT OFFICE.

ARTHUR E. MARSH, OF ELGIN, ILLINOIS.

EGG-OPENER.

1,070,827.

Specification of Letters Patent.   Patented Aug. 19, 1913.

Application filed May 11, 1912. Serial No. 696,761.

*To all whom it may concern:*

Be it known that I, ARTHUR E. MARSH, a citizen of the United States, residing at Elgin, in the county of Kane and State of Illinois, have invented new and useful Improvements in Egg-Openers, of which the following is a specification.

This invention relates to devices for opening eggs, the object in view being to provide a simple and effective device by means of which boiling hot eggs, when first removed from the water, may be easily broken or divided into sections, enabling the contents thereof to be readily removed, without at any time touching the fingers to the eggs.

A further object of the invention is to provide a device of the class described which will support the sections of the egg in convenient position for access to the contents thereof, after the cutting or breaking operation has been performed.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of the device, showing the parts thereof in position to receive the egg, and also illustrating the method of picking up the egg. Fig. 2 is a similar view, showing the position the parts assume after the egg has been grasped and is ready for the insertion of the cutting teeth, preparatory to breaking the egg in half. Fig. 3 is a similar view, showing the position of the parts are made to assume after the egg has been divided, and the sections thereof are ready to have their contents removed. Fig. 4 is a detail plan view, showing the cutting teeth and the levers by which they are carried. Fig. 5 is a cross section taken on the line 5—5 of Fig. 2.

The egg opener contemplated in this invention comprises two main frame members 1 and 2, each embodying a main handle portion 3, and a fork extending substantially at right angles to the inner end thereof, and comprising the oppositely located and spaced branches 4, which are terminally pivoted together, as shown at 5, that is to say, the branches 4 at one side are pivoted together, and the branches at the opposite side are pivotally connected independently of the aforesaid branches, thus leaving a space between the extremities of the forks for the passage of the egg, while it is being clasped by the egg holding members, hereinafter described.

In connection with the two main frame members of the device hereinabove described, I employ a pair of oppositely arranged egg holding members 6 which are of cup form being given the approximate shape of the two end portions of an egg, and said members are connected to the forked arms 4, between which they are held in any convenient manner.

Each of the egg holding members 6 is composed of light flexible material, such as sheet metal, and corresponds in its general shape to half of an average sized egg. Each egg holding member comprises a substantially cylindrical body portion 7 which is split or divided, as shown in Fig. 5, and provided at diametrically opposite points with outwardly extending lugs 8 which are received in slots 9 in the fork arms 4, above described, thus enabling each of the egg holding members to be detached from the frame of the device when required for cleaning. Each of the egg holding members is further provided at its outer side with outwardly extending spring tongues 10 and 11 adapted to embrace the adjacent end of the egg, when applied thereto in the manner illustrated in Fig. 1, so that the egg is picked up by the two egg holding members, and the device is then inverted from the position shown in Fig. 1 to the position shown in Fig. 2.

It will be noted that the pivots 5 are arranged below the plane of the egg holding members 6, so that when the handles 3 are swung toward each other, as shown in Fig. 3, the inner ends of the egg holding members 6 will be moved apart, thereby allowing the opened ends of the egg sections to be exposed, so as to be easily accessible to a spoon or knife for removing the contents of the shells.

In order to puncture and break the shell of the egg, centrally thereof, I provide a pair of cutter levers 12 which pass through the handles 3 and are pivotally connected thereto at 13. At their inner ends, these levers are provided with interfitting projections 14, from which pointed teeth 15 extend inwardly, and it will be noted that by overlapping the projections 14 in the manner shown in Fig. 4, the pointed teeth 15 are brought substantially into alinement with each other. These teeth pass downward between the adjacent edges of the egg holding members 6 and puncture the shell, centrally, so that when the levers or handles 3 are rocked from the position shown in Fig. 2 to the position shown in Fig. 3, the egg is broken in half, the teeth 15 materially assisting in this operation, and rendering it unnecessary to touch the egg with the fingers. It will further be noted that when the handles 3 are in line with each other, as shown in Fig. 2, a space is left between the inner ends of the egg holding members 6 to admit of the working of the cutting levers 12.

Each of the main frame members 1 and 2 is preferably made of sheet metal, bent into the form shown, to comprise the two equal side members, and the connecting web.

In using the device, the same is held in the position shown in Fig. 1, directly over the egg lying on the table or upon a plate, and the egg holding members 6 are then pressed downward over the egg, until the egg is firmly clasped thereby. Before lifting the egg and the implement, the egg is centrally punctured and cut by pressing upward on the cutting levers 12, which serves to sink the cutters into the center of the egg. After this is accomplished, the two levers 3 are rocked from the position shown in Fig. 2 to the position shown in Fig. 3, and the open ends of the two half sections of the egg are then exposed, so that the contents of the shells may be removed with ease. The empty shells are easily displaced by moving the cutters 15 out of engagement with the shells and shaking the latter out of place.

What is claimed is:

An egg opener, comprising pivotally connected frame members, each embodying a handle, and a fork extending substantially at a right angle to the handle, the forks being pivotally connected together at their extremities, oppositely arranged complemental egg holding members carried by the forks and mounted therein, and shell puncturing means pivotally connected to the frame members and provided with teeth for puncturing the egg shell between the egg holding members.

In testimony whereof I affix my signature in presence of two witnesses.

ARTHUR E. MARSH.

Witnesses:
JOHN M. WEHNER,
VERN D. HILL.

Copies of this patent may be obtained for five cents each, by addressing the "Commissioner of Patents, Washington, D. C."